United States Patent
Nakaoka et al.

(10) Patent No.: US 8,472,318 B2
(45) Date of Patent: Jun. 25, 2013

(54) COMMUNICATION METHOD, BASE STATION DEVICE USING THE SAME, TERMINAL DEVICE, AND COMMUNICATION SYSTEM

(75) Inventors: Ken Nakaoka, Ichinomiya (JP); Kiyoshige Ito, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 408 days.

(21) Appl. No.: 12/918,231

(22) PCT Filed: Feb. 12, 2009

(86) PCT No.: PCT/JP2009/000559
§ 371 (c)(1),
(2), (4) Date: Nov. 11, 2010

(87) PCT Pub. No.: WO2009/104370
PCT Pub. Date: Aug. 27, 2009

(65) Prior Publication Data
US 2011/0044254 A1 Feb. 24, 2011

(30) Foreign Application Priority Data
Feb. 18, 2008 (JP) .................. 2008-036711

(51) Int. Cl.
*H04L 12/28* (2006.01)
*H04W 4/00* (2009.01)
*H04J 3/00* (2006.01)
*G06F 15/16* (2006.01)

(52) U.S. Cl.
USPC ........ 370/230.1; 370/235; 370/338; 370/345; 709/229

(58) Field of Classification Search
USPC .............. 370/229–240, 310–350, 401–409; 455/432.1–466; 709/223–244, 249
See application file for complete search history.

(56) References Cited

U.S. PATENT DOCUMENTS

| 7,224,684 | B2 * | 5/2007 | Hirano et al. | 370/348 |
| 7,684,813 | B2 * | 3/2010 | Benson et al. | 455/517 |
| 8,060,144 | B2 * | 11/2011 | Matsumaru | 455/561 |
| 8,149,800 | B2 * | 4/2012 | Sawada | 370/338 |

FOREIGN PATENT DOCUMENTS

| JP | 2004-128785 | 4/2004 |
| JP | 2004-260258 | 9/2004 |

OTHER PUBLICATIONS

Masahiro Morikura, et al., "802.11 High-Speed wireless LAN text book", pp. 60-63, Impress, Inc., Jul. 21, 2005, Japan. (In Japanese with its English translation).
International Search Report issued in International Patent Application No. PCT/JP2009/000559, dated Mar. 10, 2009.

(Continued)

*Primary Examiner* — Tri H Phan
(74) *Attorney, Agent, or Firm* — McDermott Will & Emery LLP

(57) ABSTRACT

A packet communication unit and a signal processing unit communicate with a plurality of terminals, respectively, in an infrastructure mode. A control unit controls the communications performed by the packet communication unit and the signal processing unit. The control unit permits two of the plurality of terminal apparatuses to communicate with each other in an ad-hoc mode, over a predetermined period time, and specifies the ad-hoc period to at least the two terminal apparatuses via the packet communication unit and the signal processing unit.

9 Claims, 9 Drawing Sheets

OTHER PUBLICATIONS

International Preliminary Report on Patentability and Written Opinion of the International Searching Authority, issued in International Patent Application No. PCT/JP2009/000559, dated Oct. 5, 2010.

Japanese Office Action, and English translation thereof, issued in Japanese Patent Application No. 2008-036711 dated May 8, 2012.

* cited by examiner

COMMUNICATION METHOD, BASE STATION DEVICE USING THE SAME, TERMINAL DEVICE, AND COMMUNICATION SYSTEM

RELATED APPLICATIONS

This application is the U.S. National Phase under 35 U.S.C. §371 of International Application No. PCT/JP2009/000559, filed on Feb. 12, 2009, which in turn claims the benefit of Japanese Application No. 2008-036711, filed on Feb. 18, 2008, the disclosures of which Applications are incorporated by reference herein.

TECHNICAL FIELD

The present invention relates to a communication technology, and it particularly relates to a communication method for communicating the signals between a base station apparatus and terminal apparatuses, a communication method for communicating the signals between a plurality of terminal apparatuses, and a base station apparatus, terminal apparatuses and a communication system using said methods.

BACKGROUND TECHNOLOGY

Two kinds of network modes, which are an infrastructure mode and an ad-hoc mode, are principally available in the network configuration of wireless LAN (Local Area Network) complying with the standards such as IEEE802.11. The infrastructure mode is such that a base station apparatus and a terminal apparatus are connected to each other and the terminal apparatus communicates with other terminal apparatuses via the base station apparatus. On the other hand, the ad-hoc mode is such that the terminal apparatuses directly communicate with each other without the need for the base station apparatus (See Non-patent Document 1, for instance).
[Non-patent Document 1] Masahiro MORIKURA and Shuji KUBOTA, "802.11 High-Speed wireless LAN text book", pp. 60-63, Impress, Inc., Jul. 21, 2005, Japan

DISCLOSURE OF THE INVENTION

Problems to be Solved by the Invention

Generally, a user manually switches the network mode between the infrastructure mode and the ad-hoc mode. That is, the user sets either the infrastructure mode or ad-hoc mode in a terminal apparatus before a communication starts. Accordingly, the terminal apparatus cannot execute the infrastructure mode and the ad-hoc mode in parallel. However, a situation arises where the user desires to execute the infrastructure mode and the ad-hoc mode parallelly. For example, let us suppose here a situation where the base station apparatus is placed on a roadway and a terminal apparatus is installed in a vehicle. Suppose also that the vehicle is equipped with an image pickup device for use in a vehicle. While the vehicle is moving, the terminal apparatus in the infrastructure mode connects to a network via the base station apparatus. When the vehicle stops, the terminal apparatus now in the ad-hoc mode transmits the captured images to other terminal apparatuses. In such a situation, it is preferable that the network mode is automatically switched between the infrastructure mode and the ad-hoc mode.

The present invention has been made in view of the foregoing circumstances, and a purpose thereof is to provide a communication technology by which to automatically switch the network mode between the infrastructure mode and the ad-hoc mode.

Means for Solving the Problems

In order to resolve the above problems, a base station apparatus according to one embodiment of the present invention communicates with at least a first terminal apparatus and a second terminal apparatus, and the base station apparatus comprises: a communication unit configured to communicate with the first terminal apparatus and the second terminal apparatus which are of a type different from the base station apparatus; and a control unit configured to control a communication performed by the communication unit. The control unit permits a direct communication between the first terminal apparatus and the second terminal apparatus over a predetermined period of time, and the control unit instructs, via the communication unit, the first terminal apparatus and the second terminal apparatus to execute the permitted direct communication therebetween.

Another embodiment of the present invention relates also to a terminal apparatus. The terminal apparatus communicates with at least a base station apparatus and another terminal apparatus, and the terminal apparatus comprises: a communication unit configured to communicate with the base station apparatus which is of a type different from the terminal apparatus; and a control unit configured to control a communication performed by the communication unit. The control unit includes: a receive unit configured to receive, from the base station apparatus via the communication unit over a predetermined period of time, an instruction indicating that the terminal apparatus communicates directly with the another terminal apparatus connected to the base station apparatus wherein the another terminal is a terminal apparatus of the same type as the terminal apparatus; and a switching unit configured to switch a target apparatus to be communicated with the communication unit from the base station apparatus to the another terminal apparatus, over a specified period of time, when the instruction is received by the receive unit.

Still another embodiment of the present invention relates to a communication system. The communication system comprises: a base station apparatus; and a plurality of terminal apparatuses configured to communicate with the base station apparatus. The base station apparatus permits a direct communication between two of the plurality of terminal apparatuses over a predetermined period of time, and instructs at least the two terminal apparatuses to execute the permitted direct communication therebetween; and the two of the plurality of terminal apparatuses directly communicates with each other over a specified period of time.

Still another embodiment of the present invention relates to a communication method. The method comprises: communicating with a first terminal apparatus and a second terminal apparatus which are of a type different from a base station apparatus, in the base station apparatus that communicates with at least the first terminal apparatus and the second terminal apparatus; permitting a direct communication between the first terminal apparatus and the second terminal apparatus over a predetermined period of time; and instructing the first terminal apparatus and the second terminal apparatus to execute the permitted communication therebetween.

Still another embodiment of the present invention relates also to a communication method. The communication method comprises: communicating with a base station apparatus which is of a type different from a terminal apparatus, in the terminal apparatus that communicates with at least the base station apparatus and another terminal apparatus; receiving, from the base station apparatus over a predetermined period of time, an instruction indicating that said terminal apparatus communicates directly with the another terminal apparatus; and switching a communication party from the base station apparatus to the another terminal apparatus over a specified period of time, when the instruction is received.

Optional combinations of the aforementioned constituting elements, and implementations of the invention in the form of methods, apparatuses, systems, recording media, computer programs and so forth may also be practiced as additional modes of the present invention.

EFFECT OF THE INVENTION

The present invention automatically switches the network mode between the infrastructure mode and the ad-hoc mode.

DESCRIPTION OF THE REFERENCE NUMERALS

Figure 1:
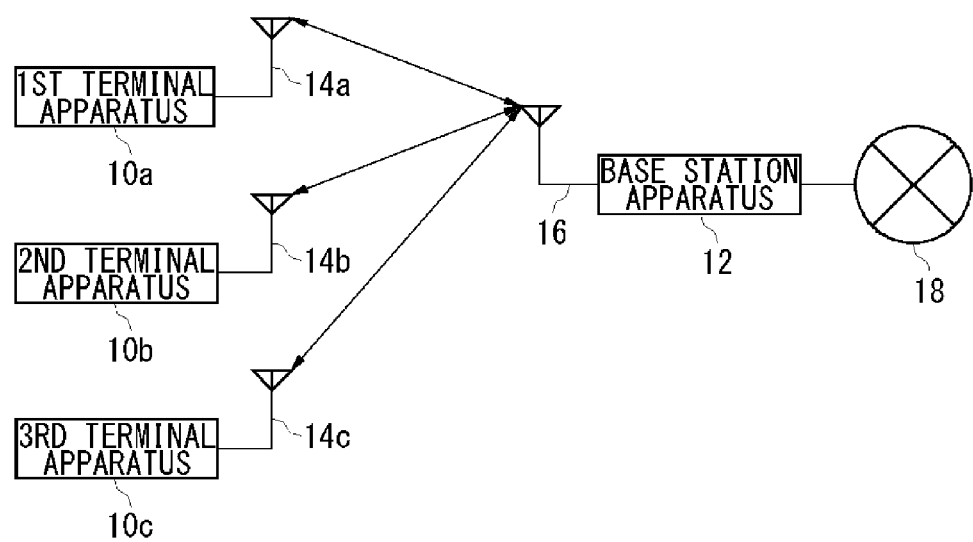
FIG. 1 illustrates a structure of a communication system according to an exemplary embodiment of the present invention.

10 Terminal apparatus
12 Base station apparatus
14 Terminal antenna
16 Base-station antenna
18 Network
20 Packet communication unit
22 Signal processing unit
24 Control unit
28 Packet receiver
30 Packet transmitter
32 Packet processor
34 Packet generator
36 Detector
38 Requesting unit
40 Receive unit
42 Switching unit
50 Packet communication unit
52 Signal processing unit
54 Wired communication unit
56 Packet receiver
58 Packet transmitter
60 Packet processor
62 Packet generator
64 Control unit
68 Acquisition unit
70 Decision unit
72 Instruction unit
100 communication system

BEST MODE FOR CARRYING OUT THE INVENTION

An outline of the present invention will be given before a specific description thereof. An exemplary embodiment of the present invention relates to a communication system comprised of a base station apparatus and terminal apparatuses as in a wireless LAN system. In the communication system, an infrastructure mode and an ad-hoc mode are prescribed. Under such circumstances, the communication system according to the exemplary embodiment carries out the following processing to automatically switch the network mode between the infrastructure mode and the ad-hoc mode. Note that a terminal apparatus is normally set to the infrastructure mode and communicates with the base station apparatus in the infrastructure mode.

If a terminal apparatus desires the switching to the ad-hoc mode, the terminal apparatus will convey a request for the switching to the ad-hoc mode and a destination in the ad-hoc mode to the base station apparatus. Upon receipt of this notification, the base station apparatus permits the change to the ad-hoc mode, over a predetermined length of time, to said terminal apparatus and a terminal apparatus which is the destination, and conveys the content of such permission to at least these two terminal apparatuses. The two terminal apparatuses communicate with each other in the ad-hoc mode over a permitted length of time. Note that, during said length of time, other terminal apparatuses, whose network mode is set to the infrastructure mode, communicate with the base station apparatus. In this manner, the base station apparatus manages terminal apparatuses, which are permitted to communicate in the ad-hoc mode, and the length of time during the ad-hoc mode is permitted, so that the network mode can be automatically switched between the infrastructure mode and the ad-hoc mode.

FIG. 1 shows a structure of a communication system 100 according to an exemplary embodiment of the present invention. The communication system includes a first terminal apparatus 10a, a second terminal apparatus 10b and a third terminal apparatus 10c, which are generically referred to as "terminal apparatus 10" or "terminal apparatuses 10", a base station apparatus 12, and a network 18. The first terminal apparatus 10a includes a first antenna 14a for the first terminal apparatus 10a. The second terminal apparatus 10b includes a second antenna 14b for the second terminal apparatus 10b. The third terminal apparatus 10c includes a third antenna 14c for the third terminal apparatus 10c. The base station apparatus 12 includes an antenna 16 for the base station apparatus 12 (base-station antenna 16). The first terminal antenna 14a, the second terminal antenna 14b and the third terminal antenna 14c are generically referred to as "terminal antenna 14" or "terminal antennas 14".

At one end of the base station apparatus 12, the base station apparatus 12 forms a wireless network by the base-station antennas 16, whereas, at the other end thereof, the base station apparatus 12 connects to the network 18. If the terminal apparatus 10 is in the infrastructure mode, the base station apparatus 12 will communicate with the terminal apparatus so as to relay data in either between the terminal apparatus 10 and the network 18 or between the terminal apparatus 10 and other terminal apparatuses 10. If, on the other hand, the terminal apparatus 10 is in the ad-hoc mode, the base station apparatus 12 will not be involved in the communication performed between the terminal apparatuses 10. However, the base station apparatus 12 permits the direct communication between two terminal apparatus among a plurality of terminal apparatuses 10, namely the ad-hoc mode, over a predetermined length of time. Also, the base station apparatus 12 instructs at least two terminal apparatuses 10 to execute the permitted direct communication in the ad-hoc mode.

In other words, the base station apparatus 12 is not involved in the communication in the ad-hoc mode but schedules the period during which the communication in the ad-hoc mode is performed. The detail of scheduling processes carried out by the base station apparatus 12 will be discussed later. Also, while the two terminal apparatuses 10 are communicating with each other in the ad-hoc mode, a terminal apparatus 10 may communicate with another terminal apparatus 10 in the infrastructure mode. Note that the communication system 100 is of a configuration using a wireless LAN system complied with a standard such as IEEE801.11. Thus any known technique may be used in the communications in the infrastructure mode and the communications in the ad-hoc mode and therefore the repeated description thereof is omitted here.

The terminal apparatus 10 enters a service area of the base station apparatus 12 and receives beacon from the base station apparatus 12, thereby establishing a connection with the base station apparatus 12. As described above, the infrastructure mode and the ad-hoc mode are defined in the communications by the terminal apparatuses 10; when the infrastructure mode is selected, the terminal apparatus 10 communicates with the base station apparatus 12. On the other hand, when a communication period in the ad-hoc mode (hereinafter referred to as "ad-hoc period") is instructed by the beacon sent from the base station apparatus 12, the terminal apparatus 10 communicates with another terminal apparatus 10 in the ad-hoc mode over the ad-hoc period. The switching between the infrastructure mode and the ad-hoc mode in the terminal apparatus 10 will be discussed later. Similar to the "ad-hoc period", the communication period in the infrastructure mode is referred to as "infrastructure period".

Figure 2:
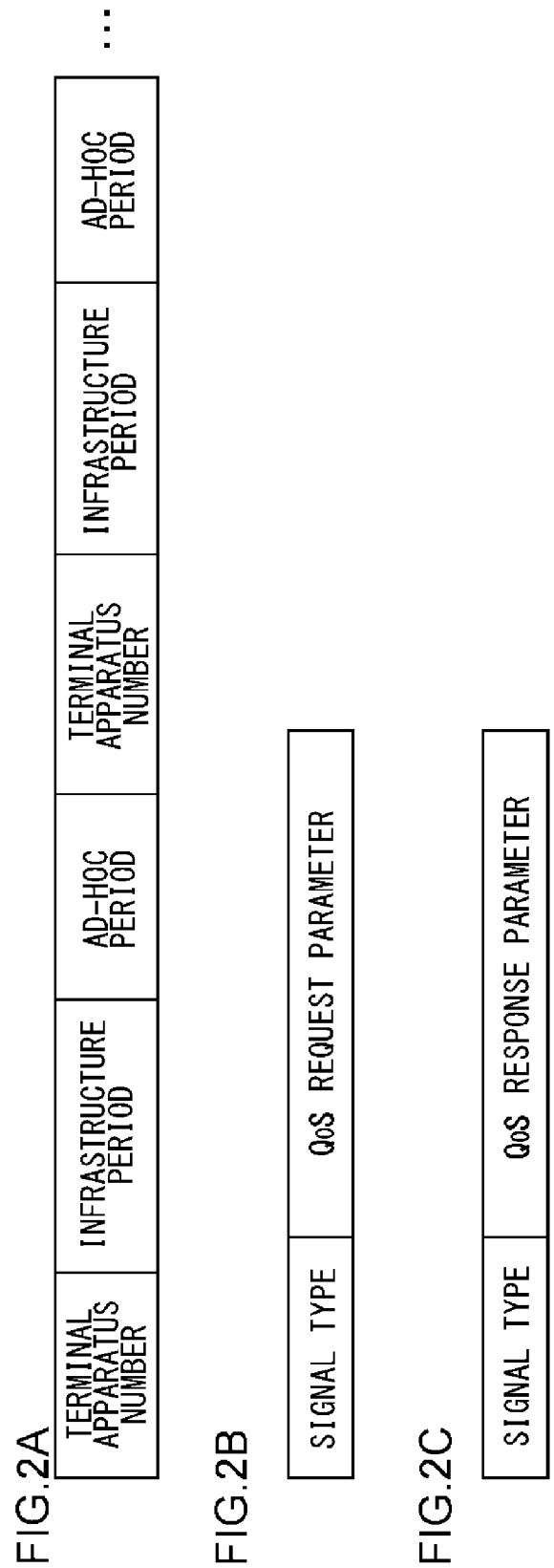
FIG. 2A to FIG. 2C are packet formats in the communication system of FIG. 1.

FIG. 2A to FIG. 2C are packet formats in the communication system 100. FIG. 2A shows a format of information contained in beacon broadcast from the base station apparatus 12. As shown in FIG. 2A, the format includes a plurality of combinations wherein each combination is composed of "terminal apparatus number", "infrastructure period", and "ad-hoc period". The terminal apparatus number includes information used to identify each terminal apparatus 10 as shown in FIG. 1. The infrastructure period and the ad-hoc period include values associated with them, respectively. The information on time is shared in the communication system 100, and the infrastructure period and the ad-hoc period are indicated by the commonly-shared time. For example, the infrastructure period includes start time and end time of a given infrastructure period. The same applies to the ad-hoc period. Assume herein that an operation in the infrastructure mode is in effect implicitly if no terminal apparatus number is indicated.

FIG. 2B shows a format of request signal that is transmitted from the terminal apparatus 10 to the base station apparatus 12. In the communication system 100, a predetermined period of time after the base station apparatus 12 has transmitted beacon is defined to be an "admission period". The terminal apparatus 10 transmits a request signal in the admission period. One example of the request signal is a signal indicating the participation in the communication system 100, which may be said to be a request for access to the base station apparatus 12. In this case, a preset value is inputted to a "signal type" as the participation request. The OoS class and the desired values of delay, throughput and the like are included in a QoS request parameter. Since any known technique may be used, the description thereof is omitted here. If a communication in the ad-hoc mode is requested, the terminal apparatus number and the data amount used to identify a target terminal apparatus 10 to be communicated with will be contained in the QoS request parameter. If the request signal is a signal requesting a change, a preset value will be inputted to the "signal type" as the change request. The change request is a signal used when the content of the QoS request parameter that the terminal apparatus 10 has already sent is to be changed.

FIG. 2C shows a format of response signal that is transmitted from the base station apparatus 12 to the terminal apparatus 10. If the base station apparatus 12 receives the request signal in an admission period, the base station apparatus 12 will transmit the response signal to the request signal, to the terminal apparatus 10. If the request signal is a participation request signal, a participation response signal will be transmitted as the response signal; if the request signal is a change request signal, a change response signal will be transmitted as the response signal. In such a case, a preset value is inputted to the signal type as a participation response or a change signal. Also, a value corresponding to the QoS request parameter is inputted to the QoS request parameter.

Figure 3:
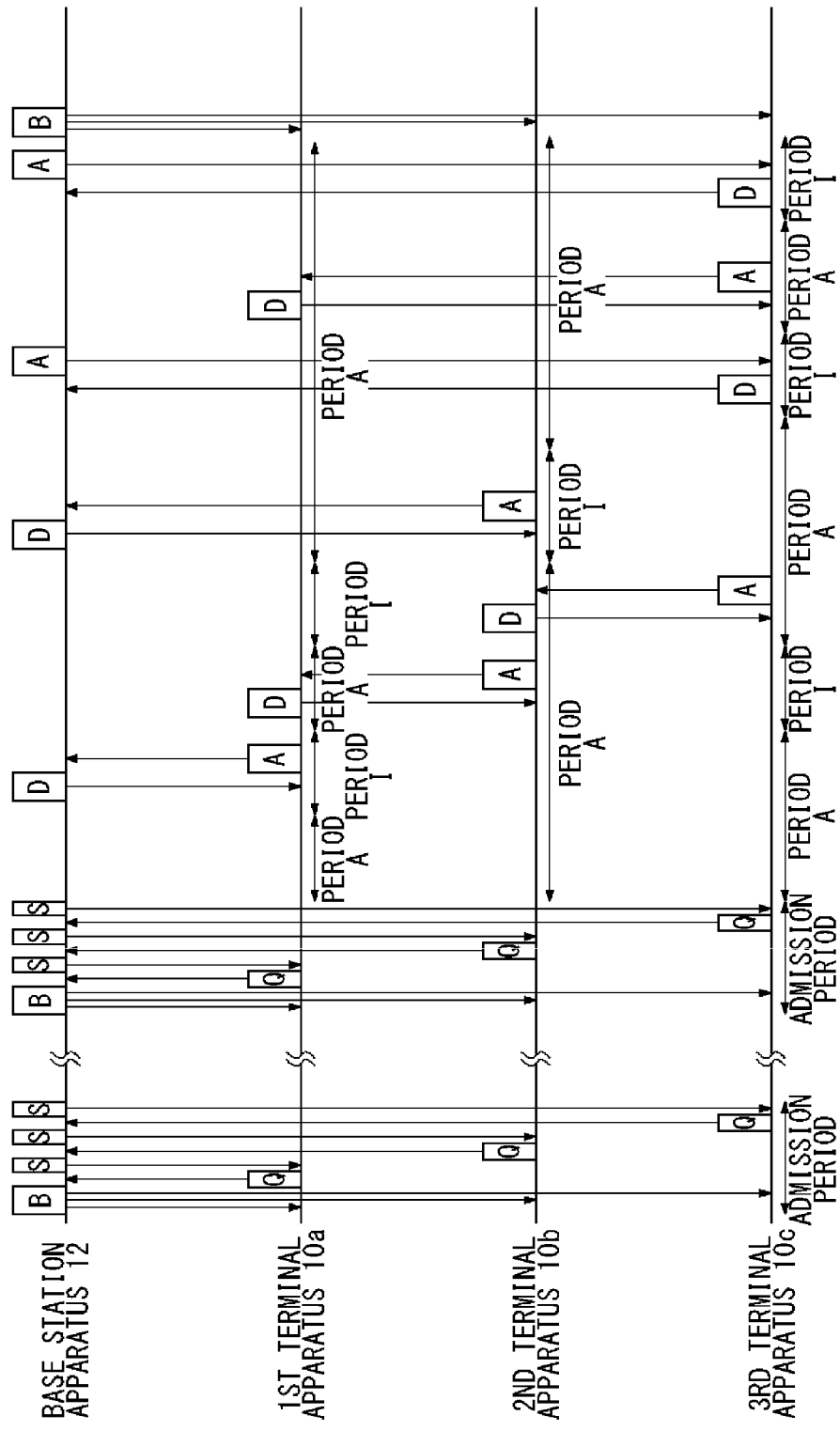
FIG. 3 is a sequence diagram outlining a communication procedure in the communication system of FIG. 1.

FIG. 3 outlines a communication procedure in the communication system 100. The base station apparatus 12, the first terminal apparatus 10a, the second terminal apparatus 10b and the third terminal apparatus 10c shown in FIG. 3 correspond to those shown in FIG. 1, respectively. In FIG. 3, "B" indicates beacon, "Q" a request signal, and "S" a response signal. "D" indicates a data signal and "A" an ACK signal. "Period A" indicates an ad-hoc period, "period I" an infrastructure period. Assume here that, in the initial state, the first terminal apparatus 10a to the third terminal apparatus 10c are not connected to the base station apparatus 12. Also, the direction from the base station apparatus 12 to the terminal apparatus 10 corresponds to a downlink, whereas the direction from the terminal apparatus 10 to the base station apparatus 12 corresponds to an uplink.

The base station apparatus 12 broadcasts beacon at regular intervals. A predetermined period of time after the base station apparatus 12 has transmitted beacon is defined as the admission period. The admission period is a length of time within which the terminal apparatus 10 requests a connection to the base station apparatus 12. A terminal apparatus 10, which has not established a connection with the base station apparatus 12 during this admission period, recognizes the presence of the base station apparatus 12 if it receives the beacon transmitted from the base station apparatus 12. Here, the first terminal apparatus 10a transmits the request signal to the base station apparatus 12, whereas the base station apparatus 12 transmits the participation response to the first terminal apparatus 10a through the response signal. The second terminal apparatus 10b and the third terminal apparatus 10c each executes the similar operation in conjunction with the first terminal apparatus 10a. As a result, the first terminal apparatus 10a to the third terminal apparatus 10c are connected to the base station apparatus 12.

In the not-shown admission periods, at least the first terminal apparatus 10a and the second terminal apparatus 10b transmit the change request to the base station apparatus 12. In this case, the change request sent from the first terminal apparatus 10a contains a request for the communication with the second terminal apparatus 10b and the third terminal apparatus 10c in the ad-hoc mode, whereas the change request sent from the second terminal apparatus 10b contains a request for the communication with the third terminal apparatus 10c in the ad-hoc mode. The base station apparatus 12 executes scheduling based on these requests, and broadcasts beacon by having a scheduling result contained in the second beacon of FIG. 3 as shown in FIG. 2A. In other words, the base station apparatus 12 specifies the periods I and the periods A to each terminal apparatus 10. Each of the first terminal apparatus 10a to the third terminal apparatus 10c receives the beacon, and transmits the next request signal and then receives the next response signal in the admission period.

After the admission period has ended, the first terminal apparatus 10a enters a period I followed by a period A, according to an instruction given from the base station apparatus 12. In the period I, the first terminal apparatus 10a receives a data signal sent from the base station apparatus 12 and then transmits an ACK signal in response to the received data signal, to the base station apparatus 12. Then, the period I is changed to the period A. Then the first terminal apparatus 10a transmits the data signal to the second terminal apparatus 10b after verifying that the second terminal apparatus 10b, to which the data signal is to be transmitted, is in the period A. As, in an ad-hoc period, the second terminal apparatus 10b receives the data signal sent from the first terminal apparatus 10a, the second terminal apparatus 10b transmits an ACK signal in response to the received data signal, to the first terminal apparatus 10a. Since the second terminal apparatus 10b continues to be in the ad-hoc period, the second terminal apparatus 10b transmits a data signal to the third terminal apparatus 10c after verifying that the third terminal apparatus 10c, to which the data signal is to be transmitted, is in the period A. As, in an ad-hoc period, the third terminal apparatus 10c receives the data signal sent from the second terminal apparatus 10b, the third terminal apparatus 10c transmits an ACK signal in response to the received data signal, to the second terminal apparatus 10b.

The applicable period of the second terminal apparatus 10b is changed from the period A to the period I. And in the period I, the second terminal apparatus 10b receives a data signal sent from the base station apparatus 12 and transmits an ACK signal in response to the received data signal, to the base station apparatus 12. Also, the applicable period of the third terminal apparatus 10c is changed from the period A to the period I. And in the period I, the third terminal apparatus 10c transmits a data signal to the base station apparatus 12 and receives an ACK signal in response to the transmitted data signal, from the base station apparatus 12. Further, the applicable period of the third terminal apparatus 10c is changed from the period I to the period A. With that timing, the applicable period of the first terminal apparatus 10a is set to the period A, too. The first terminal apparatus 10a transmits a data signal to the third terminal apparatus 10c after verifying that the third terminal apparatus 10c, to which the data signal is to be transmitted, is in the period A. As, in an ad-hoc period, the third terminal apparatus 10c receives the data signal sent from the first terminal apparatus 10a, the third terminal apparatus 10c transmits an ACK signal in response to the received data signal, to the first terminal apparatus 10a. The applicable period of the third terminal apparatus 10c is changed from the period A to the period I. And in the period I, the third terminal apparatus 10c transmits a data signal to the base station apparatus 12 and receives an ACK signal in response to the transmitted data signal, from the base station apparatus 12. Then the base station apparatus 12 broadcasts beacon.

Figure 4:
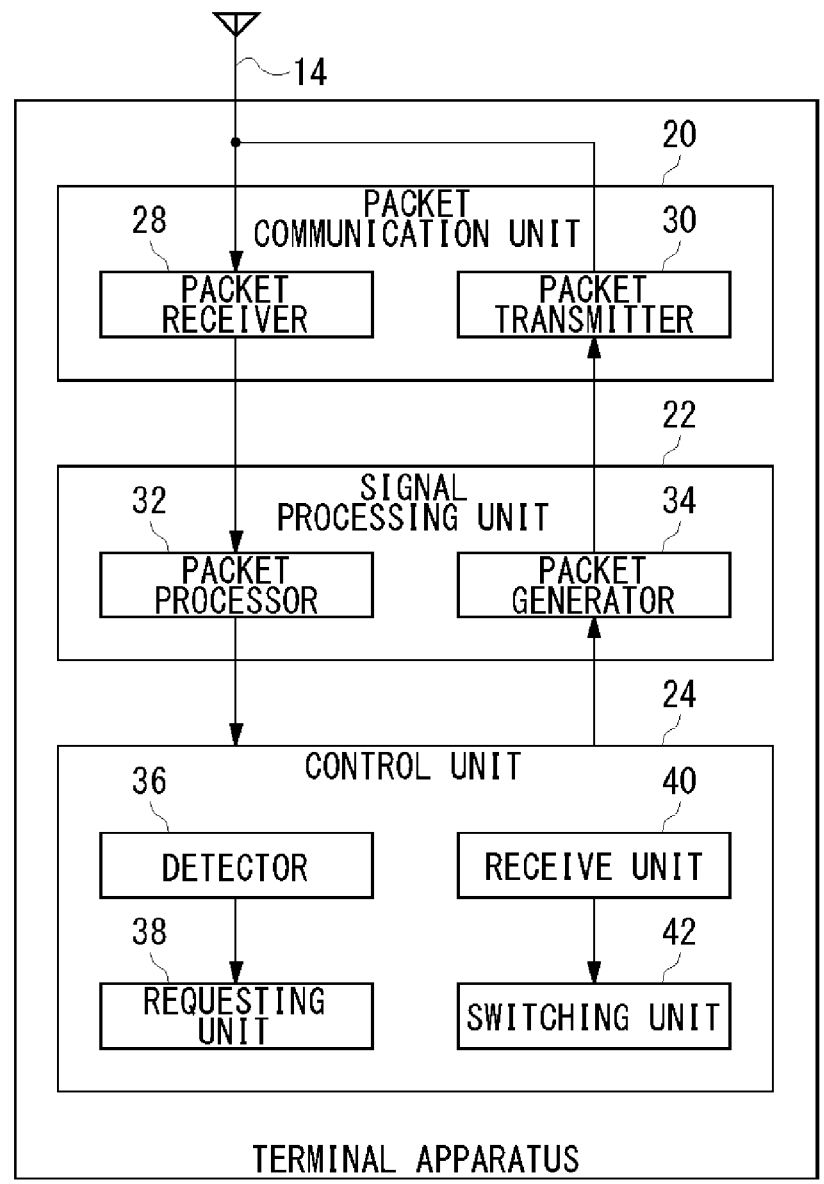
FIG. 4 illustrates a structure of a terminal apparatus of FIG. 1.

FIG. 4 illustrates a structure of a terminal apparatus 10. The terminal apparatus 10 includes a terminal antenna 14, a packet communication unit 20, a signal processing unit 22, and a control unit 24. The packet communication unit 20 includes a packet receiver 28 and a packet transmitter 30. The signal processing unit 22 includes a packet processor 32 and a packet generator 34. The control unit 24 includes a detector 36, a requesting unit 38, a receive unit 40, and a switching unit 42.

The packet receiver 28 performs demodulation processing and the like on a packet signal received by the terminal antenna 14. Since the packet signal received by the terminal antenna 14 is a radiofrequency-domain signal, the packet receiver 28 carries out frequency conversion of the packet signal from the radiofrequency domain to the baseband domain. Then, the packet is subjected to demodulation processing and decoding processing, and a packet signal defined in layers above a physical layer is outputted to the packet processing unit 32. The packet processing unit 32 receives the packet signals from the packet receiver 28 and performs upper-layer processing, such as connection processing, according to packet signals contained in the received packet signals. The upper layers correspond to layers defined in levels higher than the physical layer. The packet processing unit 32 outputs a processing result to the control unit 24. In such a case, a known technique may be used as the upper layer processing and therefore the description thereof is omitted here.

The packet generator 34 receives information sent from the control unit 24 and generates packet signals based on the information. Similar to the packet signals inputted to the packet processor 32, the packet signals generated by the packet generator 34 are equivalent to packet signals defined in layers above the physical layer. The packet generator 34 outputs the generated packet signals to the packet transmitter 30. The packet transmitter 30 codes and modulates the packet signals outputted from the packet generator 34. Also, the packet transmitter 30 carries out frequency conversion of the modulated packet signals from the baseband domain to the radiofrequency domain. Then, the packet transmitter 30 transmits the frequency-converted packet signals from the terminal antenna 14. The processing performed by the packet receiver 28 and the packet transmitter 30 corresponds to a radio communication processing.

The control unit 24 controls communication operations in the terminal apparatus 10. The operations are described hereunder in the following order. That is, described first is a processing in which a terminal apparatus is connected to the not-shown base station apparatus 12. Next is a processing for the request for the communication in the ad-hoc mode. Then described is a communication processing in which the network mode is switched between the infrastructure mode and the ad-hoc mode. The control unit 24 recognizes the presence of the base station apparatus 12 by receiving the beacon, sent from the not-shown base station apparatus 12, via the packet receiver 28 and the packet processor 32. The control unit 24 instructs the packet generator 34 to generate a participation request in the base station apparatus 12. The control unit 24 has the packet generator 34 and the packet transmitter 30 transmit the participation request to the base station apparatus 12. Then the control unit 24 receives a participation response, sent from the base station apparatus 12, via the packet receiver 28 and the packet processor 32, which in turn establishes a connection with the base station apparatus 12. As a result, the communication becomes possible between the terminal apparatus 10 and the base station apparatus 12.

A description is next given of the processing for the request for the communication in the ad-hoc mode. The detector 36 verifies the destination of data generated in an application running in the terminal apparatus 10. As a result, the detector 36 detects the presence of the data addressed to another terminal apparatus 10 being connected to the base station apparatus 12. If the detector 36 detects the presence of data, the detector 36 will inform the requesting unit 38 accordingly. In so doing, the detector 36 also conveys the information on the another terminal apparatus 10, to which the data is destined, to the requesting unit 38. The requesting unit 38 receives, from the detector 36, a notification indicating that the presence of data has been detected and a notification on the another terminal apparatus 10 which is the destination of the data. The requesting unit 38 instructs the packet generator 34 to generate a request signal. The request signal meant here is a participation request or change request signal. The requesting unit 38 has a request for communication in the ad-hoc mode with another terminal apparatus 10 and the information on the another terminal apparatus 10 which is the destination of the data, contained in the request signal. In the above-described admission period, the packet generator 34 and the packet transmitter 30 transmit the request signal to the base station apparatus 12.

A description is now given of the communication processing in which the network mode is switched between the infrastructure mode and the ad-hoc mode. The receive unit 40 receives beacon sent from the base station apparatus 12, via the packet receiver 28 and the packet processor 32. The receive unit 40 extracts fields related to the scheduling, namely the fields as indicated in FIG. 2A, from the beacon. In particular, the receive unit 40 extracts the fields related to its own scheduling. As a result, the receive unit 40 receives, from the base station apparatus 12, instructions indicating that the communication with another terminal apparatus 10 being connected to the base station apparatus 12 be performed in the ad-hoc mode, over an ad-hoc period. Also, the receive unit 40 receives instructions indicating that the communication with the base station apparatus 12 be performed in the infrastructure mode, over an infrastructure period. The receive unit 40 notifies the switching unit 42 of the infrastructure period and the ad-hoc period.

Based on the notification sent from the receive unit 40, the switching unit 42 achieves the communication in the infrastructure mode, over an infrastructure period. That is, the target apparatus to be communicated with is set to the base station apparatus 12. Also, the switching unit 42 achieves the communication in the ad-hoc mode, over an ad-hoc period. For example, when the applicable period is to be switched from the infrastructure period to the ad-hoc period, the switching unit 42 switches the target apparatus to be communicated with a communication unit, from the base station apparatus 12 to another terminal apparatus 10. A known technology may be used for the communication in the infrastructure mode and the communication in the ad-hoc mode and therefore the description thereof is omitted here. When data is to be transmitted to the another terminal apparatus 10 in an ad-hoc period, the control unit 24 references the fields related to the scheduling and thereby verifies whether the another terminal apparatus 10 is in an ad-hoc period or not. If the another terminal apparatus 10 is in an ad-hoc period, the control unit 24 will transmit the data. On the other hand, even if the other two terminal apparatuses 10 are in ad-hoc periods, the control unit 24 may have the packet communication unit 20 and the signal processing unit 22 execute an infrastructure-mode communication.

These above-described structural components may be implemented hardwarewise by a CPU, memory and other LSIs of an arbitrary computer, and softwarewise by memory-loaded programs having communication functions or the like. Depicted herein are functional blocks implemented by cooperation of hardware and software. Therefore, it will be obvious to those skilled in the art that the functional blocks may be implemented by a variety of manners including hardware only, software only or a combination of both.

Figure 5:
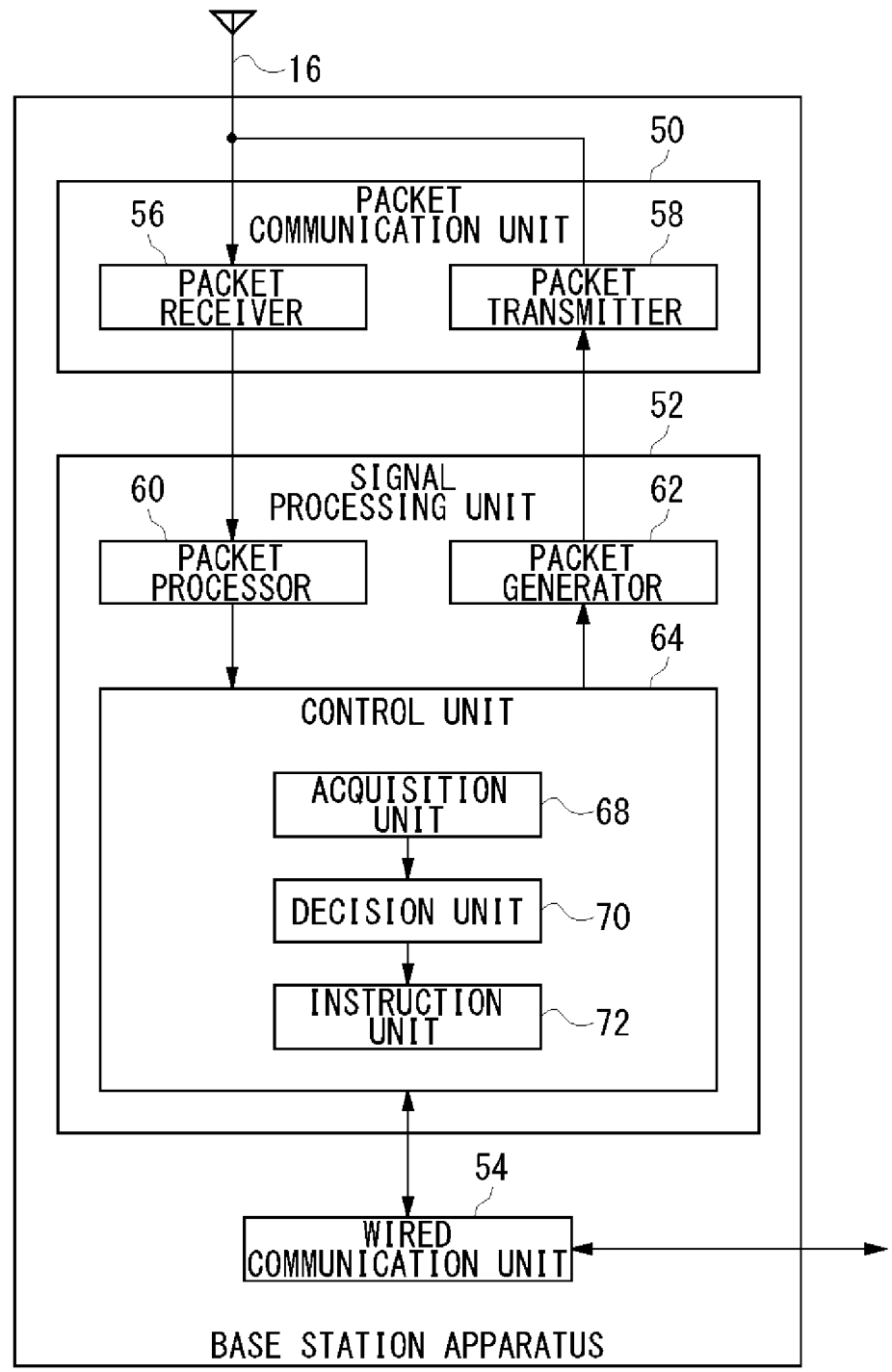
FIG. 5 illustrates a structure of the base station apparatus of FIG. 1.

FIG. 5 illustrates a structure of the base station apparatus 12. The base station apparatus 12 includes a base-station antenna 16, a packet communication unit 50, a signal processing unit 52, and a wired communication unit 54. The packet communication unit 50 includes a packet receiver 56 and a packet transmitter 58. The signal processing unit 52 includes a packet processor 60, a packet generator 62, and a control unit 64. The control unit 64 includes an acquisition unit 68, a decision unit 70, and an instruction unit 72.

The packet receiver 56 performs the same processing as that of the above-described packet receiver 28, whereas the packet transmitter 58 performs the same processing as that of the packet transmitter 30. The packet transmitter 58 transmits a beacon signal at regular intervals. The beacon signal contains information as shown in FIG. 2A.

The packet processing unit 60 receives packet signals from the packet receiver 56 and performs upper-layer processing, such as connection processing, according to packet signals contained in the received packet signals. As described above, the upper layers correspond to layers defined in levels higher than the physical layer. The packet processing unit 60 outputs a processing result to the control unit 64. The control unit 64 controls the operations of the base station apparatus 12 in its entirety, the connection processing for the terminal apparatus 10, and other functions. The control unit 64 will be described in detail later.

The packet generator 62 generates packet signals based on instructions given by the control unit 64. Corresponding to the packet signals inputted to the packet processor 60, the packet signals generated by the packet generator 62 are equivalent to packet signals defined in layers above the physical layer. The packet generator 62 outputs the generated packet signals to the packet transmitter 58.

The wired communication unit 54, which is connected to the network 18 of FIG. 1, performs wired communications using the network 18. That is, the wired communication unit 54 outputs the data, which is sent from the not-shown terminal apparatus 10 and received by the packet communicating unit 50 and the signal processing unit 52, to the network 18. Also, the wired communication unit 54 outputs the data inputted from the network 18 to the signal processing unit 52. Note that the control of the wired communication unit 54 is performed by the control unit 64.

The processing carried out by the control unit 64 is now specifically described. As described above, the control unit 64 has the packet generator 62 generate beacon at regular intervals and has the packet transmitter 58 transmit the beacon. The control unit 64 defines a predetermined period of time after the transmission of beacon to be an admission period. In the admission period, the control unit 64 receives a request signal sent from the not-shown terminal apparatus 10, via the packet receiver 56 and the packet processor 60. If the request signal is a participation request, the control unit 64 will transmit a response signal to the terminal apparatus 10 as a response to the participation request, via the packet generator 62 and the packet transmitter 58, if the connection is to be granted. Since any known technique may be used in the connection processing for the terminal apparatus 10, the description thereof is omitted here. If the request signal is a change request, the control unit 64 will transmit a response signal to the terminal apparatus 10 as a response to the change request, via the packet generator 62 and the packet transmitter 58.

The acquisition unit 68 extracts, from the received request signal, a request for communication in the ad-hoc mode and the information on a terminal apparatus 10 with which the base station apparatus 12 is to communicate. In this case, a terminal apparatus 10 which is the source (sender) of the communication in the ad-hoc mode is called a "transmitting source" or "source", whereas a terminal apparatus 10 to be communicated therewith is called a "transmitting destination" or "destination". The acquisition unit 68 outputs the extracted information to the decision unit 70

Based on the information fed from the acquisition unit 68, the decision unit 70 determines infrastructure periods and ad-hoc periods for each terminal apparatus 10. For example, the decision unit 70 determines an ad-hoc period in a manner such that the ad-hoc period in a transmitting source overlaps with an ad-hoc period in a transmitting destination. Also, the decision unit 70 allocates infrastructure periods and ad-hoc periods to the remaining periods. It is to be noted here that the ad-hoc period alone may be assigned to a preselected terminal apparatus 10 and the infrastructure period alone may be assigned to a preselected terminal apparatus 10. Through such a processing described as above, the decision unit 70 permits the communication in the ad-hoc mode to two of a plurality of terminal apparatuses 10 over an ad-hoc period while the communication in the infrastructure mode is principally in effect. In this case, the decision unit 70 determines only the infrastructure periods and the ad-hoc periods for each terminal apparatus 10 but does not control the communications in the determined infrastructure periods and ad-hoc periods.

Based on the scheduling result in the decision unit 70, the instruction unit 72 has the packet generator 62 generate beacon via the control unit 64. The beacon is of a format as shown in FIG. 2A. In other words, the instruction unit 72 instructs at least the transmitting source and the transmitting destination to execute the permitted communication in the ad-hoc mode. As described earlier, any known technique may be used in the communications in the infrastructure mode and in the ad-hoc mode and therefore the description thereof is omitted here.

There may be cases where a pair of a transmitting source and a transmitting destination happens to be another pair of a transmitting destination and a transmitting source, respectively. In other words, the two terminal apparatuses 10 in one pair are destinations of the other pair and vice versa. For example, the second terminal apparatus 10b is assigned as a transmitting destination upon request of the first terminal apparatus 10a and, at the same time, the first terminal apparatus 10a is assigned as a transmitting destination upon request of the second terminal apparatus 10b. In such a case, the acquisition unit 68 receives request signals for the communication in the ad-hoc mode, from at least two of a plurality of terminal apparatuses 10. The decision unit 70 permits the communication in the ad-hoc mode to these two terminal apparatuses 10 and, at the same time, has at least a part of ad-hoc period permitted to a given terminal apparatus 10 overlapped with the ad-hoc periods of the other terminal apparatuses 10. Though the two terminal apparatuses 10 are in ad-hoc periods, the control unit 64 has the packet communication unit 50 and the signal processing unit 52 communicate with the other terminal apparatuses 10 in the infrastructure mode.

Figure 6:
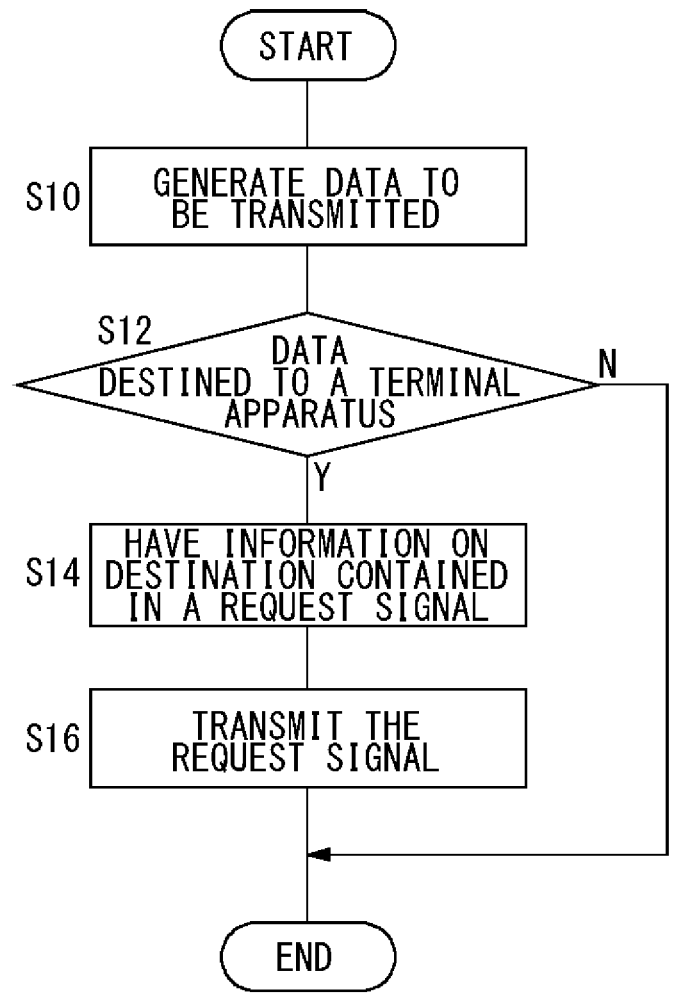
FIG. 6 is a flowchart showing a transmitting procedure for transmitting a request signal in the terminal apparatus of FIG. 4.

An operation of the communication system 100 configured as above will now be described. FIG. 6 is a flowchart showing a transmitting procedure for transmitting a request signal in the terminal apparatus 10. The detector 36 detects the generation of data to be transmitted (S10). If the data is addressed to another terminal apparatus 10 (Y of S12), the requesting unit 38 will instruct the packet generator 34 to have the information on the destination contained in the request signal (S14). The packet generator 34 and the packet transmitter 30 transmit the request signal in the admission period (S16). If, on the other hand, the data is not the data addressed to any other terminal apparatuses (N of S12), the processing will be terminated.

Figure 7:
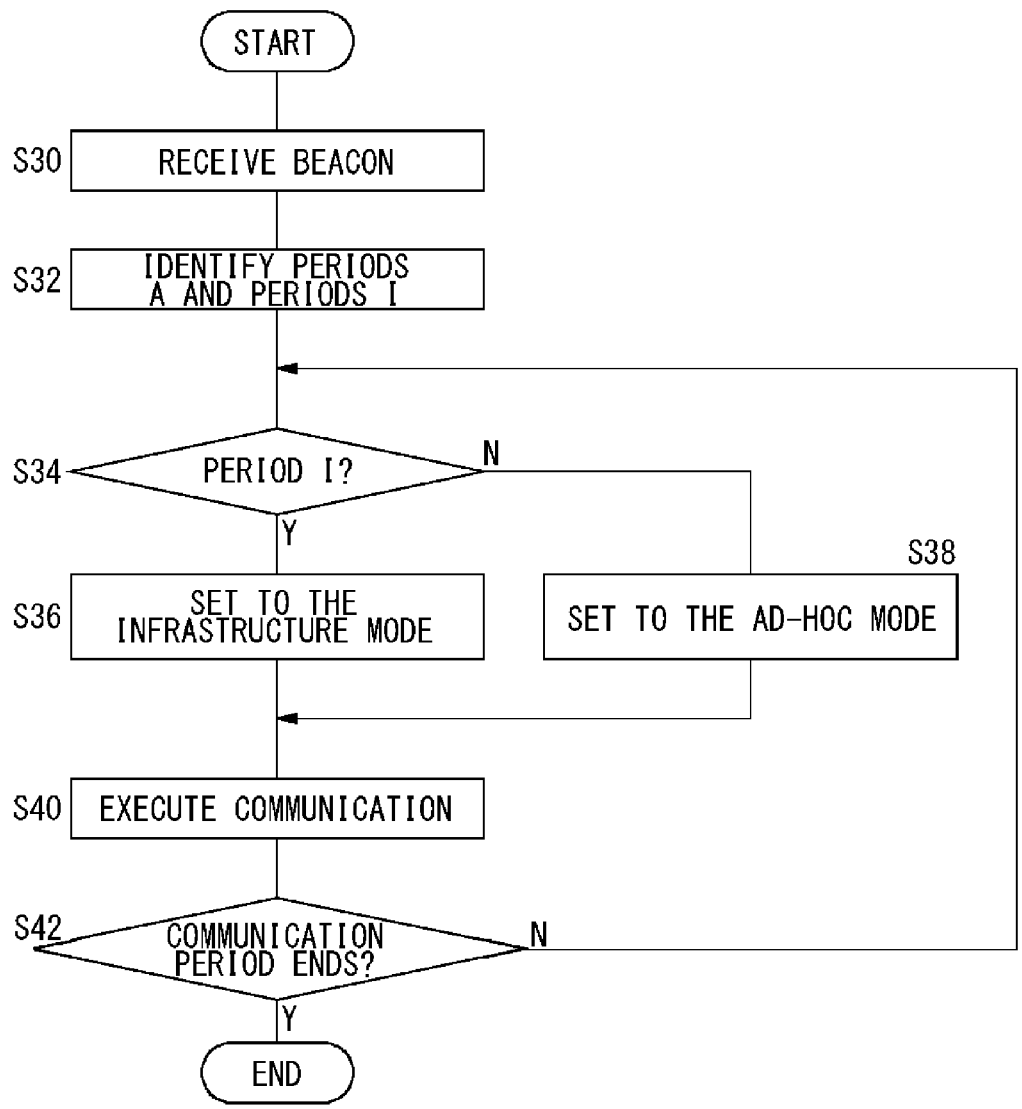
FIG. 7 is a flowchart showing a communication procedure performed by the terminal apparatus of FIG. 4.

FIG. 7 is a flowchart showing a communication procedure performed by the terminal apparatus 10. The receive unit 40 receives the beacon (S30). The switching unit 42 identifies periods A and periods I (S32). If the applicable period is period I (Y of S34), the switching unit 42 will set the packet communication unit 20 and the signal processing unit 22 to the infrastructure mode (S36). If it is not the period I (N of S34), the switching unit 42 will switch the packet communication unit 20 and the signal processing unit 22 to the ad-hoc mode (S38). The packet communication unit 20 and the signal processing unit 22 execute a communication (S40). If the communication period does not terminate (N of S42), the procedure will return to Step S34. If the communication period ends (Y of S42), the processing will be terminated.

Figure 8:
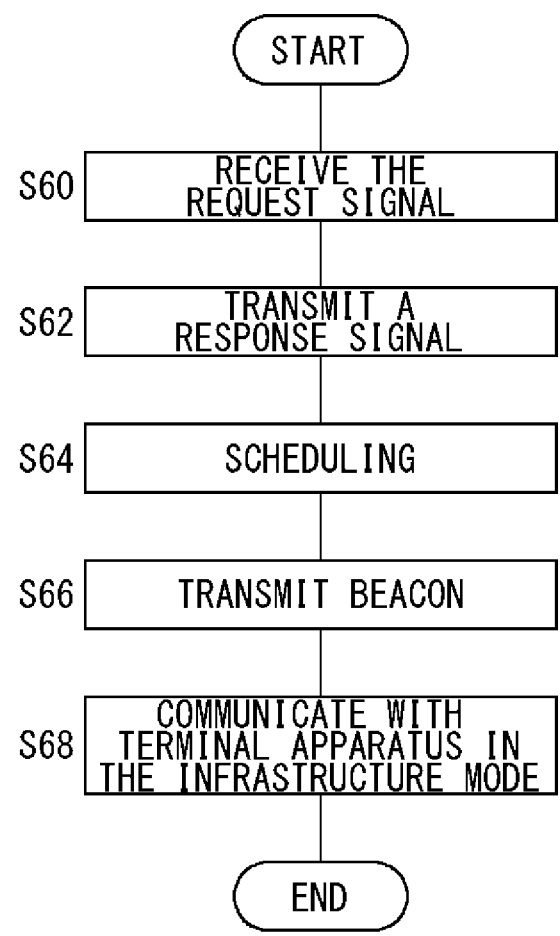
FIG. 8 is a flowchart showing a communication procedure performed by the base station apparatus of FIG. 5.

FIG. 8 is a flowchart showing a communication procedure performed by the base station apparatus 12. The acquisition unit 68 receives the request signal in the admission period, via the packet communication unit 50 and the signal processing unit 52 (S60). The acquisition unit 68 transmits a response signal (S62). The decision unit 70 carries out a scheduling (S64). The instruction unit 72 instructs the packet generator 62 and the packet transmitter 58 to transmit the beacon containing a scheduling result (S66). The packet communication unit 50 and the signal processing unit 52 communicate with a terminal apparatus 10 in the infrastructure mode (S68).

Figure 9:
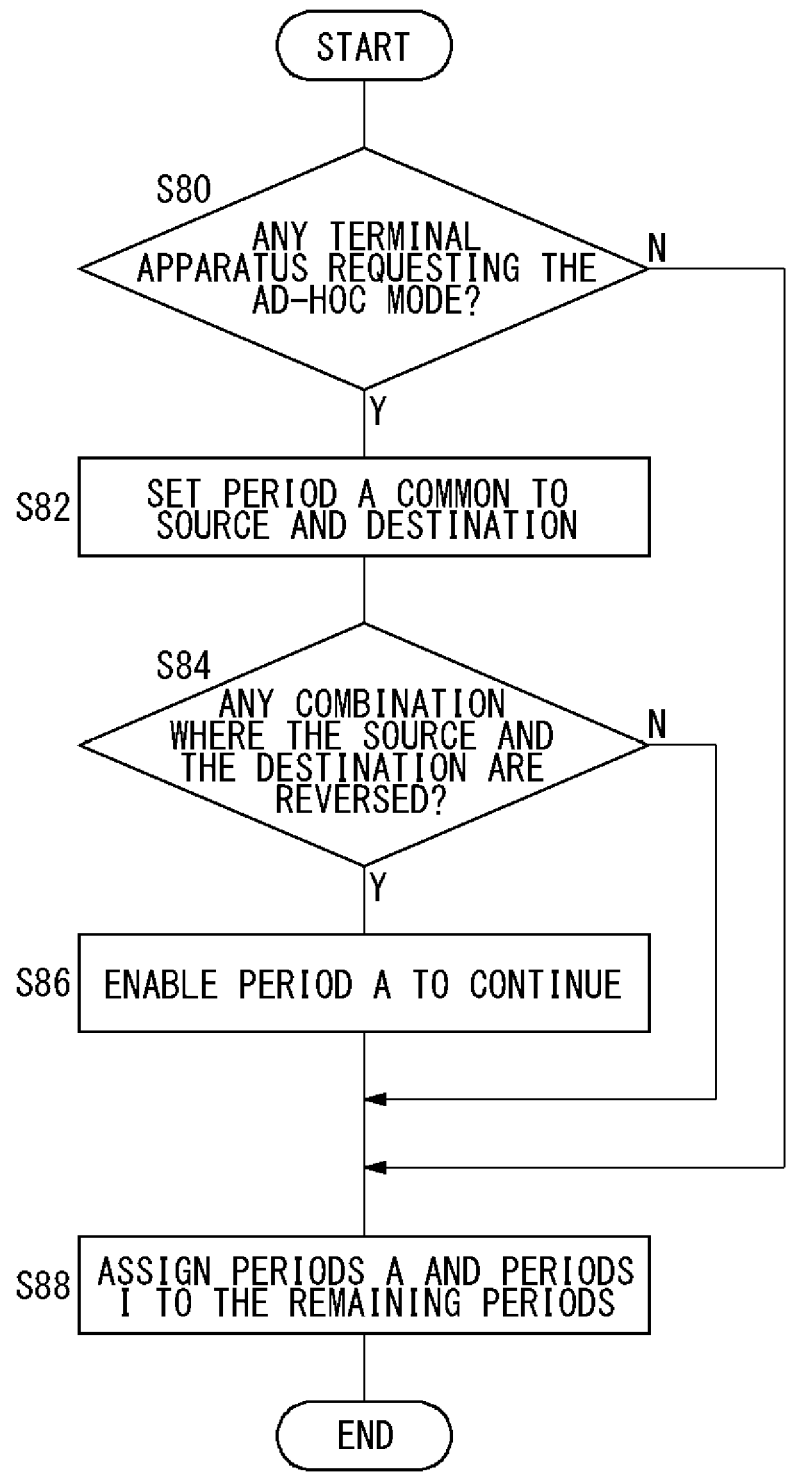
FIG. 9 is a flowchart showing a scheduling procedure performed by the base station apparatus of FIG. 5.

FIG. 9 is a flowchart showing a scheduling procedure performed by the base station apparatus 12. This scheduling procedure performed thereby corresponds to the processing performed by the decision unit 70. If there is any terminal apparatus 10 requesting the ad-hoc mode (Y of S80), the decision unit 70 will set period A which is common to both the transmitting source and the transmitting destination (S82). If there is any pairs where the transmitting sources and the transmitting destinations are reversed (Y of S84), the decision unit 70 will enable the periods A of such pairs to run continuously (S86). If, on the other hand, there is no such pairs (N of S84), Step S86 will be skipped. If there is no terminal apparatuses 10 requesting the ad-hoc mode (N of S80), Step 82 to Step 86 will be skipped. The decision unit 70 allocates periods A and periods I to the remaining periods (S88).

By employing the exemplary embodiment of the present invention, two of a plurality of terminal apparatuses communicate with each other over a predetermined period of time while a communication is being performed in the infrastructure mode. Thus, the infrastructure mode and the ad-hoc mode can be combined. Also, a transmitting source and a transmitting destination are identified based on a request signal sent from a terminal apparatus requesting a communication in the ad-hoc mode, and an ad-hoc period that overlaps in the transmitting source and the transmitting destination is determined. Hence, an ad-hoc period can be automatically specified. Since an ad-hoc period is automatically specified, the network mode can be automatically switched between the infrastructure mode and the ad-hoc mode.

Also, even when an ad-hoc period is set for the two terminal apparatuses, a communication performed between the base station apparatus 12 and a terminal apparatus other than these two terminal apparatuses can continue. Also, both infrastructure periods and ad-hoc periods are managed, so that the combination of the infrastructure and the ad-hoc mode can be easily achieved. Also, the communication in the ad-hoc mode is not controlled at all, so that the control can be simply performed. Also, if each of two terminal apparatuses are each other's destination, at least a part of ad-hoc period for the two terminal apparatus will be overlapped with each other. Hence, ad-hoc periods can be efficiently assigned. Since ad-hoc periods are efficiently assigned, the ad-hoc periods can be reduced.

The network mode is switched between the infrastructure mode and the ad-hoc mode, according to an instruction, as to an ad-hoc period and an infrastructure, contained in the beacon. Thus the network mode can be automatically switched between the infrastructure mode and the ad-hoc mode. Also, a communication in the ad-hoc mode is requested whenever the communication in the ad-hoc mode is required. Thus, the communications reflecting the intention of the user of a terminal apparatus can be achieved. Also, the request signal is transmitted in the admission period, so that the probability of collision between the request signal and the data can be reduced.

The present invention has been described based on the exemplary embodiment. This exemplary embodiment is intended to be illustrative only, and it is understood by those skilled in the art that various modifications to constituting elements and processes as well as arbitrary combinations thereof could be developed and that such modifications and combinations are also within the scope of the present invention.

In the exemplary embodiment of the present invention, the decision unit 70 determines ad-hoc periods based on the information on a terminal apparatus 10 which is the intended communication party. However, this should not be considered as limiting and, for example, the amount of data may be a factor in determining the ad-hoc periods by the decision unit 70. In this case, the decision unit 70 lengthens an ad-hoc period as the amount of data becomes larger. According to this modification, an ad-hoc period suitable for the amount of data can be set.

In the exemplary embodiment of the present invention, the base station apparatus 12 notifies each terminal apparatus 10 of an ad-hoc period. However, this should not be considered as limiting and, for example, the base station apparatus 12 may further inform a terminal apparatus 10 which is the destination of data in the ad-hoc period. In this case, each terminal apparatus 10 transmits the data to the specified terminal apparatus 10 and receives data sent from the specified terminal apparatus 10. According to this modification, the communication in the ad-hoc mode can also be controlled in a unified manner by the base station apparatus 12. Thus, the communication in the ad-hoc mode can be improved efficiently.

Industrial Applicability

The present invention automatically switches the network mode between the infrastructure mode and the ad-hoc mode.

What is claimed is:

1. A base station apparatus for communicating with at least a first terminal apparatus and a second terminal apparatus, the base station apparatus comprising:

a communication unit configured to communicate with the first terminal apparatus and the second terminal which are of a type different from said base station apparatus; and a control unit configured to control a communication performed by said communication unit, wherein said control unit permits a direct communication between the first terminal apparatus and the second terminal apparatus over a predetermined period of time, and said control unit instructs, via said communication unit, the first terminal apparatus and the second terminal apparatus to execute the permitted direct communication therebetween.

2. A base station apparatus according to claim 1, wherein said communication unit receives a request to permit the direction communication therebetween, from the first terminal apparatus and the second terminal apparatus, said control unit including:

an acquiring unit configured to acquire information on a destination contained in each request received by said communication unit; and a decision unit configured to permit the direct communication to the first terminal apparatus and the second terminal apparatus and configured to have a period, during which the direct communication is permitted to the first terminal apparatus and the second terminal apparatus, to continue, when the destination of the first terminal apparatus is the second terminal apparatus, whereas the destination of the second terminal apparatus is the first terminal apparatus.

3. A base station apparatus according to claim 1, wherein said communication unit communicates with a third terminal apparatus in a period during which the direct communication is permitted to the first terminal apparatus and the second terminal apparatus, the third terminal apparatus being of the as type as the first terminal apparatus and the second terminal apparatus.

4. A terminal apparatus for communicating with at least a base station apparatus and another terminal apparatus, the terminal apparatus comprising:

a communication unit configured to communicate with the base station apparatus which is of a type different from said terminal apparatus; and a control unit configured to control a communication performed by said communication unit, said control unit including:

a receive unit configured to receive, from the base station apparatus via said communication unit over a predetermined period of time, an instruction indicating that said terminal apparatus communicates directly with the another terminal apparatus connected to the base station apparatus wherein the another terminal is a terminal apparatus of the same type as said terminal apparatus; and a switching unit configured to switch a target apparatus to be communicated with said communication unit from the base station apparatus to the another terminal apparatus, over a specified period of time, when the instruction is received by said receive unit.

5. A terminal apparatus according to claim 4, said control unit further including:

a detector configured to detect the presence of data addressed to the another terminal apparatus connected to the base station apparatus; and a requesting unit configured to request the base station apparatus to allow the execution of direction communication between the terminal apparatus and the another terminal apparatus, via said communication unit, when the presence of data is detected by the detector, wherein after the execution of direct communication therebetween has been requested from the requesting unit, the receive unit receives the instruction.

6. A terminal apparatus according to the claim 4, wherein said communication unit communicates with the base station apparatus even in a period during which the another terminal apparatus directly communicates with still another terminal apparatus, which is of the same type as said terminal apparatus.

7. A communication system, comprising:
a base station apparatus; and
a plurality of terminal apparatuses configured to communicate with said base station apparatus,
wherein said base station apparatus permits a direct communication between two of the plurality of terminal apparatuses over a predetermined period of time, and instructs at least the two terminal apparatuses to execute the permitted direct communication therebetween, and
wherein the two of the plurality of terminal apparatuses directly communicates with each other over a specified period of time.

8. A communication method, comprising:
communicating with a first terminal apparatus and a second terminal apparatus which are of a type different from a base station apparatus, in the base station apparatus that communicates with at least the first terminal apparatus and the second terminal apparatus;
permitting a direct communication between the first terminal apparatus and the second terminal apparatus over a predetermined period of time; and
instructing the first terminal apparatus and the second terminal apparatus to execute the permitted communication therebetween.

9. A communication method, comprising:
communicating with a base station apparatus which is of a type different from a terminal apparatus, in said terminal apparatus that communicates with at least the base station apparatus and another terminal apparatus;
receiving, from the base station apparatus over a predetermined period of time, an instruction indicating that said terminal apparatus communicates directly with the another terminal apparatus; and
switching a communication party from the base station apparatus to the another terminal apparatus over a specified period of time, when the instruction is received.

* * * * *